Dec. 5, 1933.   H. L. SULMAN ET AL   1,938,469
RECOVERY OF HYDROCYANIC ACID FROM COMPLEX CYANIDES AND WASTE LIQUORS
Filed Oct. 17, 1932
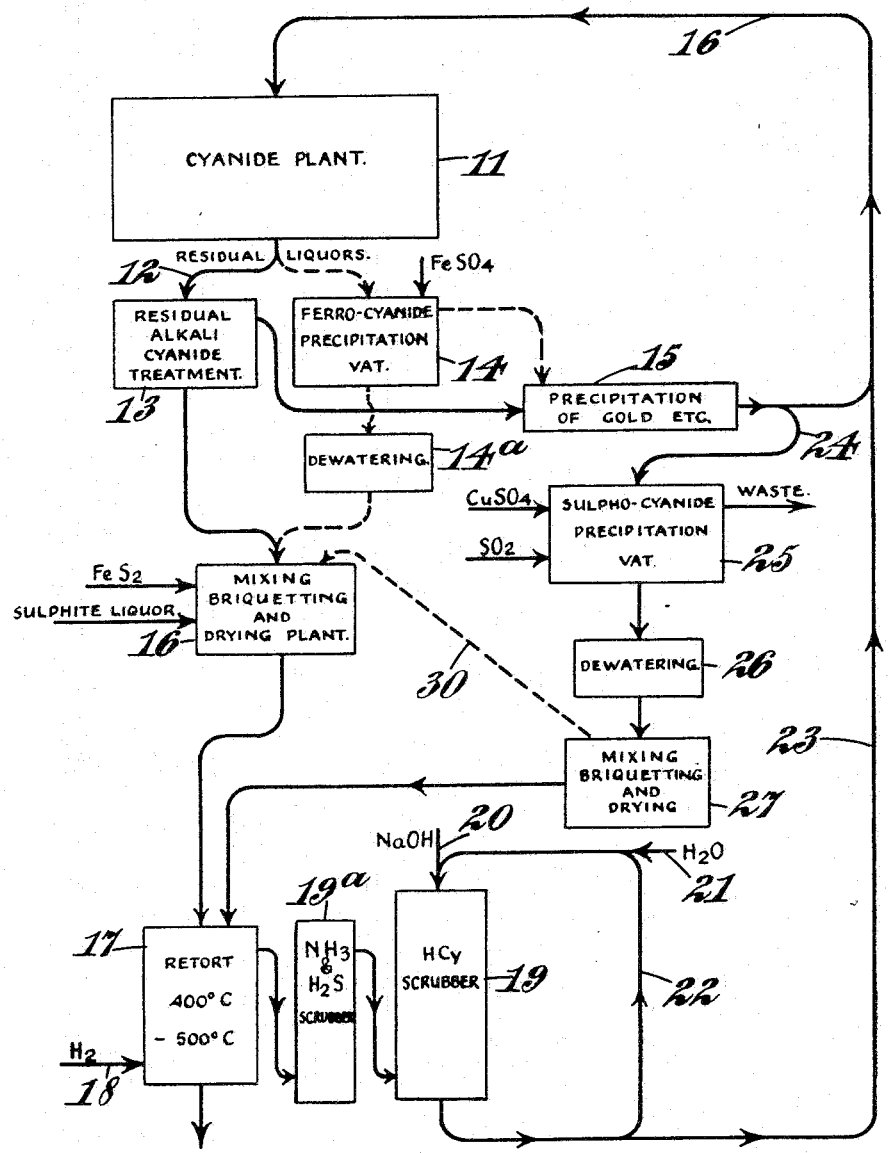
INVENTORS
Henry L. Sulman
and H. F. K. Picard,
By Watson, Coit, Morse + Grindle
ATTYS.

Patented Dec. 5, 1933

1,938,469

UNITED STATES PATENT OFFICE 1,938,469

RECOVERY OF HYDROCYANIC ACID FROM COMPLEX CYANIDES AND WASTE LIQUORS

Henry Livingstone Sulman and Hugh Fitzalis Kirkpatrick Picard, London, England, assignors to The General Engineering Company Incorporated, London, England, a corporation of Utah Application October 17, 1932, Serial No. 638,254, and in Great Britain December 18, 1931

6 Claims. (Cl. 23—79)

This invention comprises improvements in the treatment of complex cyanides and liquors containing the same. In the cyanide process of ore treatment and also in other industrial operations, for example in the scrubbing of gas liquors, there are commonly obtained certain complex cyanides such as ferrocyanides, sulphocyanides, and the like, wherein the cyanogen anion contains a metal or sulphur and such cyanides are herein referred to as complex cyanides. It is difficult to recover cyanide in soluble form from such substances, and they are useless in the extraction of gold from its ores. In ore cyaniding practice such compounds, resulting from the interaction of the ore minerals with the alkaline cyanides, are sometimes termed inert cyanides and have hitherto been regarded as loss.

Complex cyanides of the kind described when they are cyanides of heavy metals are insoluble in water, that is to say, for example, compounds of the said complex cyanides with iron, copper or zinc, if produced in liquors of the processes referred to, separate from these liquors as a precipitate or sediment.

It has been proposed to recover the hydrocyanic acid from such inert cyanides by precipitating a solution with a salt such as copper sulphate and then removing the precipitate and digesting it with suitable chemicals such as acid and copper sulphate and heating the pulp so obtained to a temperature from 600° to 900° F. in a reducing atmosphere containing hydrogen.

It is an object of the present invention to effect the recovery of the cyanides in an active form from insoluble heavy metal cyanides by heating in a reducing atmosphere in the presence of a metallic sulphide which readily yields sulphur on heating.

According to the present invention a process for the recovery of cyanide from complex heavy metal cyanides is characterized by heating the heavy metal cyanide in a hydrogen-containing atmosphere and in the presence of an added metallic sulphide (such as pyrites) which yields sulphur on heating to a temperature sufficient to set free hydrocyanic acid and to cause the heavy metal to combine with the sulphur yielded by the metallic sulphide. The temperature may lie, for example, between 400° and 500° C. It is found that at temperatures below dull redness the cyanogen-containing radicle is completely decomposed under these conditions and hydrocyanic acid comes away from the plant whilst the metal or metals of the compound are converted to sulphide or sulphides and remain behind.

The reactions which occur between the metallic double cyanides, sulphur and hydrogen are complex and the conversion of the double cyanide radicle, such as ferro-cyanogen, into hydrocyanic acid is not complete. Some of the cyanogen is decomposed into ammonia, nitrogen and other products, but when employing iron ferrocyanides and the like we have in many trials been able to convert from 70 to 75% of the total cyanogen content into alkaline cyanide solution. In this instance the effective reaction may be represented by the following equation:—

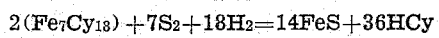

The hydrocyanic acid can be recovered in the form of alkali cyanide by scrubbing the gaseous reaction product with a solution of caustic alkali. Alternatively, the gases may be scrubbed with a suspension of an alkali earth hydrate, such as milk of lime.

In the case of complex cyanides other than sulpho-cyanides, sulphur must be added to the charge, and it is preferable to employ a source of sulphur such as iron pyrites.

In this case rather less than one half of the sulphur content of the pyrites can be regarded as available since on heating the pyrites it is decomposed into sulphur and magnetic sulphide of iron, thus:—

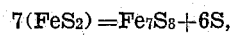

and only the latter is available for the reaction. The magnetic sulphide Fe7S8 remains with the residues.

When dealing with liquors containing soluble ferro and other double cyanides, it is a first step in our invention to convert these into their corresponding insoluble salts of, or compounds with, a suitable heavy metal such as iron zinc or copper, by precipitating such liquors with a solution of a salt of the appropriate metal, for example sulphate of iron.

In carrying out the process of the present invention it is found that no alkali or other cyanide is produced in or remains with the metallic sulphide residue after driving off hydrocyanic acid as above described. The reaction leaves a porous black residue of metallic sulphide, mainly of ferrous sulphide and magnetic sulphide of iron, which burns readily in air, yielding sulphur dioxide and, if desired, this may be utilized for the production of sulphuric acid.

The following is a description by way of example of one form of the process of the present invention as applied to the treatment of foul residual liquors from the cyanide process of ore extraction:—

The accompanying drawing is a flow sheet illustrating the sequence of the various operations in the process.

In the drawing, 11 represents a cyanide plant in which, for example, a gold ore may be treated for the recovery of the valuable metal. Residual liquor 12 from this plant is taken according to the present invention and it may be treated at 13 for the recovery of residual alkali cyanide, for example in accordance with the process set forth in the prior application for U. S. Letters Patent in the names of Durant, Sulman, and Picard, Serial No. 561,472, filed September 5, 1931, and owned by the assignee of the present application. This treatment for the recovery of residual alkali cyanide is not essential to the present invention however. If no such treatment is adopted the residual liquor 12 is conducted into a precipitation vat 14 where it is treated with sulphate of iron in quantities sufficient to precipitate the complex ferrocyanides and the like (other than sulphocyanides) which are present in the liquor and also to combine with any free alkali cyanide which may be present. The resulting precipitate consists mainly of iron ferrocyanides. The sulphate of iron liquor can be obtained by the weathering or moist oxidation of iron pyrites aided if necessary by acidification.

The clear liquor from the precipitation vat is decanted and led to a zinc box 15 where it is rendered slightly acid, say to a value of about pH4 and any gold or silver values which it contains are thereby precipitated and recovered. These values are not precipitated by the addition of sulphate of iron in the vat 14 and thus according to the present invention any residual gold or silver values are collected separately from the recovered hydrocyanic acid. The liquor from the zinc box can be returned to the cyanide plant as indicated at 16 for cyclic re-use.

The precipitated residual zinc ferrocyanide from 13 will ordinarily be dry enough to take direct to a mixing, briquetting and drying plant 16 where it is mixed with the necessary proportion of ground pyrites and with a small proportion of a suitable binder such as the "sulphite" liquor resulting from the manufacture of wood pulp, and thereafter dried. Alternatively precipitation with iron sulphate in a precipitation vat 14 is employed, the precipitate is collected, dewatered, vacuum filtered or filter-pressed in apparatus 15 and thereafter introduced into the briquetting plant 16. In either event the briquettes thus produced are taken to a retort 17.

The retort 17 is provided with an inlet 18 for hydrogenous gas and in this retort the briquettes are heated to a temperature ranging from about 400° C. to 450° C. Some liberation of hydrocyanic acid may proceed at lower ranges of temperatures than 400° C. but the reaction works well at temperatures between 400° C. and 450° C. When the temperature approaches 500° C. there is a tendency to produce sulphuretted hydrogen in undue quantity.

At an early stage of the heating the briquettes, by carbonization of the binder and by loss of water, become completely porous. The reaction with the hydrogenous gas is thereby very greatly facilitated since, in order to prevent decomposition of cyanogen into worthless products, it is important that hydrogen shall have free access to all parts of the charge.

In place of hydrogen, hydrogen containing gases such as coal gas or producer gas can be employed.

In the normal course of the reaction only very small amounts of sulphuretted hydrogen are produced, and these may be removed from the reaction products as hereinafter pointed out.

From the retort 17 the gaseous products of the reaction, including the hydrocyanic acid produced, are led through a washer or scrubber 19$^a$ containing a solution which will retain any ammonia and/or sulphuretted hydrogen that may accompany the hydrocyanic acid vapours; such a solution may suitably contain, for example, free sulphuric acid and sulphate of copper, and will combine with, and retain, ammonia and sulphuretted hydrogen, but, if maintained at a suitable temperature, will not absorb hydrocyanic acid. Thereafter the purified vapours are passed to a scrubber 19 where they are treated with a scrubbing liquor 20 to which caustic alkali, or alkaline-earth hydrate 21 is added. This converts the hydrocyanic acid into alkali cyanide or alkaline-earth cyanide, as the case may be and the washing liquor in the scrubber is recirculated as indicated at 22 until it contains a proportion of cyanide adequate to permit of a portion being drawn off at 23 and added to the liquors for use in the cyanide plant 11.

In the process thus far described, sulphocyanides are not removed from the residual liquors and as these are continuously returned to the cyanide plant 11 the sulpho-cyanide content builds up to a point at which it becomes desirable to withdraw a proportion of the liquor as indicated at 24 and to treat it for the recovery of cyanogen from the sulpho-cyanides.

Liquor drawn off at 24 is led to a precipitation vat 25 where it is treated with a solution of copper sulphate together with its equivalent of a reducing agent such as sulphur dioxide, whereby insoluble cuprous sulpho-cyanide is thrown down.

The clear liquor from the sulpho-cyanide treatment can be run to waste or if desired it can be returned to the cyanide plant as wash water or for other purposes.

The precipitate from the vat 25 is dewatered and filter-pressed in 26 and admixed with the precipitate from the vat 14 and the joint precipitate fed to the retort 17 as indicated by the dotted line 30. In this case, calculation is made of the excess sulphur in the sulpho-cyanide precipitate and the amount of FeS$_2$ added to the ferrocyanide precipitate is reduced accordingly.

It is advisable to recover gold and silver from the solution prior to precipitation of sulphocyanides because, unlike the ferrocyanide precipitate, the cuprous sulpho-cyanide will carry down with it any gold or silver values which may be present. Should, however, the gold or silver values be allowed to remain in the liquor, they are now precipitated and carried down with the cuprous sulpho-cyanide and can be removed from the cuprous sulphide product which remains behind after the reaction in the retort.

It will be clear from the description hereinabove that the invention may also be applied to the treatment of metallic ferro and other double cyanides produced in other processes. For example, it may be applied to other liquors containing ferrocyanide and sulpho-cyanides such, for example, as gas scrubbing liquors and the like from which ammonia and sulphuretted hydrogen have been previously recovered, the product being subjected to the process according to the present invention.

We claim:—

1. A process for the recovery of cyanide from heavy metal cyanides, characterized by heating the heavy metal cyanide in a reducing hydrogen-containing atmosphere and in the presence of an added metallic sulphide which yields sulphur on heating to a temperature sufficient to set free hydrocyanic acid and to cause the heavy metal to combine with the sulphur yielded by the metallic sulphide.

2. A process for the treatment of residual liquors from cyanide plants consisting in precipitating ferrous ferrocyanide by the addition of a sulphate of iron thereto, briquetting the precipitate with sulphur-bearing material, and heating the briquetted mixture in hydrogenous gases to a temperature of the order of 400° C. to 500° C.

3. A process for the recovery of cyanide from heavy metal cyanides characterized by heating the heavy metal cyanide, in a reducing hydrogen-containing atmosphere and in the presence of pyrites to a temperature sufficient to set free hydro-cyanic acid and to cause the heavy metal to combine with the sulphur yielded by the pyrites.

4. A process for the recovery of cyanide from heavy metal cyanides characterized by heating the heavy metal cyanide in a reducing hydrogen-containing atmosphere and in the presence of iron pyrites to a temperature sufficient to set free hydro-cyanic acid and cause the heavy metal to combine with the sulphur yielded by the iron pyrites.

5. A process for the treatment of residual liquors from cyanide plants consisting in precipitating heavy metal cyanides therefrom by the addition of a salt of the heavy metal desired, and thereafter briquetting the precipitate with pyrites and heating the briquetted mixture in hydrogenous gases to a temperature of the order of 400° to 500° C.

6. A process for the recovery of cyanide from residual liquors from cyanide plants consisting in separately precipitating ferrous cyanides, which contain one molecule of ferrous iron to two molecules of cyanogen, therefrom by the addition of sulphate of iron, and sulpho-cyanide by the addition of a copper salt and a reducing agent, admixing these precipitates in quantities such that the sulpho-cyanide, together with any other sulphur yielding materials present, provides adequate sulphur to react with the ferrous cyanides and produce hydrogen cyanide therefrom, and heating the mixture in a reducing hydrogen containing atmosphere to a temperature sufficient to cause interaction and to set free hydrogen cyanide.

HENRY LIVINGSTONE SULMAN.
HUGH FITZALIS KIRKPATRICK PICARD.